United States Patent Office 2,976,271
Patented Mar. 21, 1961

2,976,271

PROPYLENE POLYMERIZATION

Samuel B. Lippincott, Springfield, Robert M. Thomas, Westfield, Howard T. Oakley, Elizabeth, Robert F. Leary, Cranford, and Robert S. Brodkey, Roselle, N.J., assignors to Esso Research and Engineering Company, a corporation of Delaware No Drawing. Filed Oct. 28, 1955, Ser. No. 543,624

7 Claims. (Cl. 260—93.7)

This invention relates to polymerization and more particularly relates to an improved method for polymerizing propylene at elevated pressure.

Heretofore propylene has been polymerized to relatively low molecular weight polymers by the use of such catalysts as phosphoric acid on kieselguhr. However, there has been no effective process available for preparing high molecular weight polymers of propylene, which polymers are potentially useful as lubricating oil additives, film-forming materials and for the manufacture of molded articles. There has been therefore a long-felt need for a simple and effective method for polymerizing propylene to high molecular weight polymers.

A novel and improved process for polymerizing propylene has now been found. In brief, the present process comprises polymerizing propylene at an elevated pressure in the presence of a catalyst obtained by mixing aluminum trialkyl, aluminum dialkyl monohalide and a reducible compound of titanium. It has been found when using certain critical ratios of the catalyst components and certain critical reaction conditions, that good yields of high molecular weight polypropylene can be obtained at high conversion rates. It has also been found that by selecting certain specific reaction conditions within those encompassed generally by this invention, a high proportion of oil-soluble polypropylene can be obtained; and it has also been found that using other conditions within those encompassed generally by this invention, a high yield of essentially oil-insoluble polypropylene can be obtained. X-ray analysis of the polypropylene products has shown that the oil-soluble polypropylene is essentially amorphous in nature, whereas the oil-insoluble polypropylene is essentially crystalline in nature. It has further been found that the materials of construction of the polymerization reactors used for polymerizing propylene have a material effect upon the overall polymerization reaction. Polymerization reactors constructed of a mild alloy steel essentially free of the elements nickel, lead, platinum, palladium and cobalt are preferred.

The polymerization of propylene in accordance with the present invention is carried out at elevated pressure. More particularly, the polymerization reaction is carried out at a pressure of at least about 100 p.s.i.g. (pounds per square inch gauge). Pressures as high as 2,000 p.s.i.g. or higher may be employed, if desired. Generally it is preferred to employ pressures in the range of about 100 to 1,000 and more preferably 100 to 400 p.s.i.g. Generally the polymerization reaction temperature will be maintained in the range of about 25° to 120° C. Lower temperatures or higher temperatures (e.g., up to about 200° C.) may be employed if desired. Generally, however, it will be preferred to employ polymerization reaction temperatures in the range of about 50° to 110° C. This is because at temperatures below about 50° C. the rate of polymer formation is relatively slow, and above about 110° C., conversion falls off quite rapidly.

The catalyst employed in the present polymerization process is obtained by mixing together three components, namely (1) aluminum trialkyl, (2) aluminum dialkyl monohalide and (3) a reducible compound of titanium. The aluminum trialkyls useful in this invention have the formula $$AlR_3$$ 

where R is an alkyl group, preferably an alkyl group containing 2 to 4 carbon atoms. For a given aluminum trialkyl, it will be understood that the R radicals may be different alkyl groups. Specific examples of aluminum trialkyls include aluminum triethyl, aluminum tripropyl, aluminum tributyl, aluminum diethyl propyl, aluminum ethyl dibutyl, etc. The preferred aluminum trialkyl of this invention is aluminum triethyl because this compound can be prepared simply and inexpensively and is particularly effective in the present process.

The aluminum dialkyl monohalides useful in this invention have the formula $$AlR'_2X$$ 

where R' is an alkyl group and X is a halogen atom. Preferably R' is an alkyl radical containing 2 to 4 carbon atoms. For a given compound it will be understood that the R' radicals may be different alkyl groups. It is preferred that X be chlorine, bromine or iodine. Chlorine is particularly preferred; bromine is second choice. Specific examples of the aluminum dialkyl monohalides useful in the present process include aluminum diethyl chloride, aluminum diethyl bromide, aluminum diethyl iodide, aluminum dibutyl chloride, aluminum ethyl butyl chloride, etc. The preferred aluminum dialkyl monohalide in the present process is aluminum diethyl chloride because this compound can be prepared simply and inexpensively and is particularly effective in the present process for polymerizing propylene. The preferred reducible compound of titanium in the present invention is titanium tetrachloride ($TiCl_4$).

The catalyst is prepared by mixing the three catalyst components together in the presence of an inert liquid diluent. Since an inert liquid diluent is also employed in the polymerization process, it will be preferred generally to use the same diluent in the catalyst preparation as is employed in the polymerization reaction. The preferred inert liquid diluents useful in this invention are hydrocarbons, preferably saturated aliphatic hydrocarbons containing about 5 to 10 carbon atoms. Specific examples of such hydrocarbon diluents include pentane, hexane, heptane, octane, nonane and decane. Hexane and particularly n-heptane are preferred diluents.

Generally that portion of the catalyst comprising the aluminum alkyl compounds will contain (1) from 5 to 95, preferably 20 to 80, mol percent trialkyl aluminum and (2) 95 to 5, preferably 80 to 20, mol percent of dialkyl aluminum halide. These proportions of the two aluminum components are equivalent to a molar ratio of aluminum trialkyl to dialkyl aluminum halide in the range of about 1:19 to 19:1, preferably about 1:4 to 4:1. More preferably the molar ratio of aluminum trialkyl to dialkyl aluminum halide is in the range of about 1:2 to 2:1. These preferred ranges favor maximum total polymer yield and a high conversion rate. The molar (or atomic) ratio of aluminum to titanium in the catalyst mixture should generally be in the range of about 1:1 to 12:1 and is preferably in the range of about 1.5:1 to 6:1 and more preferably is in the range of about 2:1 to 4:1. These preferred aluminum to titanium molar ratios are those which maximize total polymer yield and conversion rate.

Generally the three catalyst components will be mixed together in the inert liquid diluent at a temperature of about 25° to 50° C. for about 0.25 to 1 hour. Generally it is convenient to mix the catalyst components together at room temperature. Higher or lower temperatures and longer or shorter mixing periods may be employed if desired, but generally it has been found that the aforementioned specific mixing conditions are preferred. The concentration of the catalyst components in the inert liquid diluent may be in the range of about 10 to 200 grams per liter. However, it has been found that exceptionally good polymerization results may be obtained when the catalyst is prepared using concentrations of the catalyst components in the inert liquid diluent in the range of about 80 to 120° grams per liter. A finely divided precipitate (or slurry) is formed in the inert liquid diluent when the three catalyst components are admixed therein.

The propylene stream fed to the polymerization zone may be pure propylene or may be a stream containing about 10 up to almost 100% of propylene, the remainder being inert components such as propane. It is important that materials which would poison the catalyst be removed from the propylene feed stream. Such poisons include oxygen, carbon monoxide, water, acetylene, etc. These poisons may be removed by passing the propylene through a solution of aluminum trialkyl, e.g., aluminum triethyl, prior to passing the stream to the polymerization reaction zone. These poisons may also be effectively removed by passing the propylene stream through a bed of activated alumina. Similarly the inert liquid diluent may likewise be passed through such purifying materials.

The concentration of propylene in the polymerization reaction zone may be from about 10 to 95% by weight of the total reaction mixture (including the inert liquid diluent). When the concentration of propylene is maintained below about 30 weight percent of the total reaction mixture, the product is a viscous slurry. At higher concentrations the product approaches a near solid mass and it is therefore desirable to operate the process in the range of about 10 to 30 weight percent propylene, based on the total reaction mixture. Generally the catalyst concentration in the polymerization reaction zone should be maintained in the range of about 0.1 to 3.0%, preferably about 0.5 to 1.5%, by weight, based on the total reaction mixture. Polymerization reaction times in the range of about 0.1 to 100 hours may be employed although usually polymerization reaction times in the range of about 0.5 to 10 hours will be employed.

Upon the completion of the polymerization reaction, the polymerization reaction mixture is preferably quenched with a material such as acetone or an alcohol. Preferred quenching materials are aliphatic hydrocarbon alcohols containing about 1 to 4 carbon atoms. Specific examples of such quenching agents include methyl alcohol, ethyl alcohol, isopropyl alcohol, n-butyl alcohol. These quenching agents solubilize the catalyst and thereby deactivate the catalyst. The oil-insoluble (e.g., n-heptane insoluble) portion of the polymer of the polypropylene product may be removed from the remainder of the reaction mixture by filtration or centrifuging. The oil-soluble (e.g., n-heptane soluble) portion of the polypropylene product may be recovered by extraction with a suitable hydrocarbon such as pentane, hexane or heptane, then stripping at atmospheric pressure or reduced pressure. The polypropylene products may be further purified by washing with hot alcohol in several stages.

The polypropylene products of this invention have intrinsic viscosities generally within the range of about 0.2 to 6.0, usually in the range of about 0.3 to 2.5. These intrinsic viscosities correspond generally to molecular weights in the range of about 5,000 to 500,000, usually about 10,000 to 100,000. The molecular weights referred to herein are obtained from the correlation of Harris in the Journal of Polymer Science, vol. 8, 361 (1952).

A number of the physical properties of polypropylene products prepared in accordance with the present invention have been determined. The polypropylene products which were tested contained about 50 wt. percent of amorphous polypropylene and about 50 wt. percent of crystalline polypropylene. The following physical properties were observed when testing nine different samples of these polypropylene products:

| Physical property: | Observed range |
|---|---|
| Intrinsic viscosity | 1.57–2.13 |
| Specific gravity | 0.86–0.88 |
| Softening point, ° C | 90–100 |
| Melting point, ° C | 150–160 |
| Melt viscosity $\times 10^{-4}$, poises @ 190° C | <1–16 |
| Tensile strength, p.s.i. (percent elongation) | 860–1650 (510–800) |
| Modulus of rigidity $\times 10^{-4}$, p.s.i.: | |
| 0.4–1.4 @ 25° C. | |
| 1.3–3.8 @ 0° C. | |
| 29–32 @ −25° C. | |
| 43–49 @ −73° C. | |

The oil-soluble polypropylene products of this invention are useful as lubricating oil additives, coating compositions, etc. and the oil-insoluble polymers are useful for film-forming materials and for the manufacture of extruded sheets, tubes and molded articles. The expression "oil-soluble polypropylene" when used in this specification refers to polypropylene which is freely soluble in paraffinic hydrocarbon oils (e.g., n-heptane) at a temperature of about 60°–70° C., and the expression "oil-insoluble polypropylene" refers to polypropylene which is essentially insoluble in paraffinic hydrocarbon oils (e.g., n-heptane) at a temperature of about 60°–70° C.

As was stated heretofore, it has also been found that by selecting certain specific reaction conditions within the ranges outlined above, a polypropylene product can be prepared containing a high proportion of amorphous polymer. The presence of this amorphous polymer has been demonstrated by X-ray analysis. It has also been found that this amorphous polymer is oil soluble (i.e., soluble in petroleum mineral oils, n-heptane, etc.). The amorphous polymer is a viscous rubbery material which is valuable as a lubricating oil additive and as a component of certain greases.

The formation of the amorphous polymer is promoted generally by (1) employing relatively high molar ratios of aluminum trialkyl to dialkyl aluminum halide, (2) employing relatively low molar ratios of aluminum to titanium and (3) employing relatively low polymerization reaction temperatures. More particularly, the formation of amorphous polymers is obtained by employing molar ratios of aluminum trialkyl to dialkyl aluminum halide in the ratio of about 1:1 to 19:1, preferably about 1:1 to 4:1. The molar ratio of aluminum to titanium in the catalyst mixture for maximizing amorphous polypropylene should generally be in the range of about 1:1 to 6:1, preferably 1.5:1 to 6:1 and more preferably about 2:1 to 6:1. The polymerization reaction temperature should be generally maintained at about 25° to 80° C., preferably about 60° to 75° C. By employing the aforedescribed reaction conditions, it is possible to produce a polypropylene product containing a major proportion of amorphous polymer and, if desired, a product containing greater than 90 weight percent of amorphous polymer.

It has also been found that by selecting certain other specific polymerization reaction conditions, a polymeric product containing a high proportion of crystalline polypropylene can be prepared. The formation of a polymeric product containing a high proportion of crystalline polypropylene is promoted generally by (1) employing relatively low molar ratios of aluminum trialkyl to dialkyl aluminum halide, (2) employing relatively high molar ratios of aluminum to titanium and (3) employing relatively high polymerization reaction temperatures. More particularly, the formation of crystalline polypropylene is obtained by employing molar ratios of aluminum trialkyl to dialkyl aluminum halide in the range of about 1:19 to 1:1, preferably about 1:4 to 1:1. The molar ratio of aluminum to titanium should generally be maintained in the range of about 6:1 to 12:1, preferably about 6:1 to 8:1. A polymeric product having a particularly high content of crystalline polypropylene is obtained using a molar ratio of aluminum trialkyl to dialkyl aluminum halide of about 1:2 and a molar ratio of aluminum to titanium of about 6:1. The formation of crystalline polypropylene is favored by employing polymerization reaction temperatures in the range of about 80° to 120° C., preferably about 90° to 105° C. By employing the aforedescribed polymerization reaction conditions, it is possible to produce a polymeric product containing a major proportion of crystalline polypropylene. Polymeric products containing greater than 80 weight percent of crystalline polypropylene can be prepared if desired in this way. The crystalline polypropylene is a strong solid material capable of being formed into such articles as bottles, pipe, battery cases and the like.

It has also been found that the materials of construction employed in the polymerization reactor have a material bearing upon the effectiveness of the present propylene polymerization process. More particularly it has been found that the polymerization process can be most effectively carried out employing a polymerization reactor constructed of a mild alloy steel essentially free of the elements nickel, lead, platinum, palladium and cobalt. Particularly effective propylene polymerizations have been carried out employing steels consisting essentially of (1) iron, carbon and chromium, and (2) iron, carbon, chromium and vanadium.

The invention will be more fully understood by reference to the following examples. It is pointed out, however, that the examples are given for the purpose of illustration only and are not to be construed as limiting the scope of the present invention in any way.

EXAMPLE I

The polymerization of propylene in this example (and in Examples II to VI) was carried out using the following general procedure. The preparation of polypropylene was carried out in a heavy nickel-free stainless steel reactor, type 410 (13% Cr) sealed with a copper gasket. Agitation was obtained by rocking the reactor back and forth during the reaction by means of an electric motor. A thermocouple well in the reactor made it possible to record temperatures throughout the run and also to control temperature by means of a Celectray.

Connected to the reactor by means of high pressure stainless steel tubing and a high pressure stainless steel valve was a stainless steel reservoir in which the propylene could be collected as a liquid and which, in turn, was connected to a cylinder of nitrogen by means of stainless steel tubing and valve, so that the liquid propylene could be forced into the reactor by means of nitrogen pressure.

In operation the reactor was placed in a nitrogen filled dry box together with the equipment needed for preparation and transfer of the catalyst and solvent. After all air had been displaced with nitrogen the desired quantities of catalyst and solvent were transferred to the reactor and the cap was put on. The reactor was then taken from the dry box and placed in the rocker. In the meantime, the desired amount of propylene was condensed in the feed reservoir and this was pressurized with nitrogen. The connection was made between the reservoir and the reactor. The rocker was started and the reactor heated electrically to the desired temperature. Propylene was then carefully valved into the reactor in portions. After all the olefin had been added the temperature was maintained at the desired level by electrical heating. At the end of the desired reaction period, the reactor was allowed to cool to room temperature and was vented through a knock-out flask and wet test meter. The reactor was then opened and the contents transferred to a flask containing 99% isopropyl alcohol. The mixture was refluxed several hours until the product became almost white, then was cooled and filtered and the precipitate was washed with more isopropyl alcohol. The solid white polymer was air dried, then dried further in a vacuum oven at 70° C. and was then weighed. The filtrate was evaporated to dryness to give an indication of the amount of oily polymer formed.

In this example, the catalyst was prepared by mixing 1.67 ml. of a 0.84 molar solution of titanium tetrachloride in n-heptane with 10 milliliters of an n-heptane solution 0.66 molar in diethyl aluminum chloride and 0.22 molar in triethyl aluminum, and diluting to 15 ml. with n-heptane. This catalyst composition was transferred to the reactor with 1.5 ml. of addition heptane. Approximately 8.8 moles of propylene were condensed into the feed reservoir which was chilled with Dry Ice. The reservoir was then pressured to 1,000 pounds per square inch with nitrogen. The cold propylene and some nitrogen were transferred to the reactor during a 5-minute period, the pressure in the reactor rising to 500 pounds per square inch, due mostly to the nitrogen. There was no spontaneous rise in temperature. The reactor was heated over a period of 1¼ hours to a temperature of about 70° C. The pressure rose to 1570 pounds per square inch during this time. During the next hour, while the temperature was maintained at about 70° C., the pressure dropped to 700 pounds per square inch. The reactor was heated overnight (16 hours) and the final conditions were 180° C. and 1160 pounds per square inch. The heat was turned off and the reactor was allowed to cool to room temperature. The reactor was vented and opened and was found to contain a mass of spongy solid which was worked up as described above. The following product was obtained:

Yield:
    Oily product_____g__ 25
    Solid product_____g__ 283
Properties of solid product: Intrinsic viscosity_____ 1.57

EXAMPLE II

The catalyst for this example was the same as that used in Example I but it was made up using three times the quantities. The propylene was forced into the reactor to a pressure of 500 pounds per square inch. The temperature rose spontaneously to 57° C. during the first ten minutes while the pressure increased to 950 pounds per square inch. During the next hour the temperature dropped to 50° C. and the pressure to 260 pounds per square inch. These conditions prevailed for the next 2½ hours. Apparently the reaction was complete in about one-half hour.

Yield:
    Oily polymer _____g__ 11
    Solid polymer _____g__ 320
Properties of the solid:
    Intrinsic viscosity _____ 3.18

EXAMPLE III

Example I was repeated except that the reactor was not heated. The temperature rose only slightly above room temperature to 30–33° C., while the pressure gradually dropped from 400 pounds per square inch to 210 pounds per square inch during 22 hours.

Yield:
    Oily polymer _____ g__    6
    Solid polymer _____ g__  167
Properties of the solid polymer:
    Softening point _____ ° C__  139
    Melting point _____ ° C__  144–180
    Intrinsic viscosity _____  2.46

EXAMPLE IV

The catalyst was prepared as described in Example I. After it had been transferred to the reactor it was diluted with 300 ml. of n-heptane. The procedure of Example I was then followed except only about 4.2 moles of liquid propylene were used. The reactor was agitated (rocked) at room temperature (28–30° C.) for 19 hours. When it was opened it was found to contain a soft solid mass, the solvent being completely absorbed by the product. After extraction with isopropyl alcohol the following results were obtained:

Yield:
    Oily polymer _____ g__    6
    Solid polymer _____ g__   50
Properties of the solid polymer:
    Softening point _____ ° C__  160
    Melting point _____ ° C__  161–164
    Intrinsic viscosity _____  4.28

EXAMPLE V

Example IV was repeated except that heat was applied to the reactor so that the temperature rose to 70° during the first 1½ hours and was maintained at 70° for an additional hour.

Yield:
    Oily polymer _____ g__    3
    Solid polymer _____ g__   78
Properties of the solid polymer:
    Softening point _____ ° C__  139
    Melting point _____ ° C__  144–180
    Intrinsic viscosity _____  2.28

EXAMPLE VI

Example V was repeated except for a shorter reaction time. The tempertaure was brought to 70° during the first hour, held there for 15 minutes, then plunged into ice water. The product was a brown semi-solid mass that became a white solid when treated with isopropyl alcohol.

Yield:
    Oily product _____ g__    3
    Solid product _____ g__   33
Properties of the solid product:
    Softening point _____ ° C__  148
    Melting point _____ ° C__  150–188
    Intrinsic viscosity _____  1.72

EXAMPLE VII.—EFFECT OF ALUMINUM COMPONENTS OF CATALYST ON CONVERSION OF PROPYLENE OF POLYMER

In this example (and in Examples VIII to XI), the polymerization of propylene was carried out employing the following general procedure: A 3-liter, stainless steel, stirred autoclave was employed. A thermocouple well in the reactor was used to record the temperature and a Bourdon tube gage to indicate the pressure. The autoclave could be heated or cooled by circulating steam or water through an exterior jacket. Connected to the autoclave with high pressure stainless steel tubing was a stainless steel reservoir in which the propylene could be condensed. Provision was made to pressure this reservoir with nitrogen. In operation the reactor was flushed several times with nitrogen. The inert diluent was then added under a blanket of nitrogen gas. The catalyst mixture was likewise charged under a blanket of inert gas. The liquid propylene, previously collected in the reservoir was then forced into the autoclave with nitrogen pressure. The reactor was heated to the desired temperature with steam. At the end of the reaction period the reaction mixture was ejected under its own pressure through a valve in the bottom of the autoclave. The product, a thick viscous slurry, was collected in a container having some alcohol in it. The reactor was rinsed several times with hexane and this material added to the initial product. The mixture was refluxed for several hours and then allowed to cool. The cool mixture was filtered. The hydrocarbon was evaporated from the filtrate to yield the oil-soluble polymer. The oil-insoluble polymer was recovered from the filter. The following typical products were obtained:

Oil-soluble polymer: Intrinsic viscosity _____ 0.25–0.70
Oil-insoluble polymer: Intrinsic viscosity ____ 0.84–2.24

In this example, five polymerization runs (runs 1 to 5) were carried out wherein only the molar ratio of aluminum triethyl to aluminum diethyl chloride in the catalyst mixture was varied in order to demonstrate the effect of this particular ratio upon the conversion of propylene to polymer. The following results were obtained:

*Table I*

EFFECT OF ALUMINUM COMPONENTS OF CATALYST ON CONVERSION OF PROPYLENE TO POLYMER

[2.8 grams total catalyst; 30 wt. percent propylene (210 g.) in n-heptane, 1 hour, 70° C., 200–400 p.s.i.g. Al/Ti ratio=6:1]

| Run No. | 1 | 2 | 3 | 4 | 5 |
|---|---|---|---|---|---|
| Catalyst Composition: | | | | | |
| Mole percent AlEt$_2$Cl | 0 | 25 | 50 | 75 | 100 |
| Mole percent AlEt$_3$ | 100 | 75 | 50 | 25 | 0 |
| Conversion, percent | 10.8 | 12.1 | 18.9 | 14.2 | 0 |

It will be noted that a high conversion of propylene to polymer is effected by utilizing a combination of an aluminum trialkyl and aluminum dialkyl chloride with titanium tetrachloride.

EXAMPLE VIII.—EFFECT OF ALUMINUM/TITANIUM RATIO IN THE CATALYST ON CONVERSION OF PROPYLENE TO POLYMER

In this example, four runs (runs 6 to 9) were carried out to demonstrate the effect of the aluminum to titanium molar ratio on the conversion of propylene to polymer. The general procedure outlined in Example VII was followed except that the molar ratio of aluminum to titanium was varied between 3:1 to 6:1 using two different AlR/AlR'X ratios. The following results were obtained in this series of experiments:

*Table II*

EFFECT OF ALUMINUM/TITANIUM RATIO IN THE CATALYST ON CONVERSION OF PROPYLENE TO POLYMER

[2.8 grams total catalyst; 30 wt. percent propylene (210 g.) in n-heptane; 1 hour, 70° C., 200–400 p.s.i.g.]

| Run No. | 6 | 7 | 8 | 9 |
|---|---|---|---|---|
| Catalyst Composition: | | | | |
| Mole percent AlEt$_2$Cl | 33 | 33 | 67 | 67 |
| Mole percent AlEt$_3$ | 67 | 67 | 33 | 33 |
| Al/Ti ratio | 6/1 | 3/1 | 6/1 | 3/1 |
| Conversion, percent | 9 | 18 | 12 | 18 |

It will be noted that a high conversion of propylene to polymer is effected by utilizing a molar ratio of aluminum to titanium of about 3:1.

EXAMPLE IX.—EFFECT OF CATALYST PREPARATION CONCENTRATION ON CONVERSION OF PROPYLENE TO POLYMER

In this example, four runs (runs 10 to 13) were carried out to demonstrate the effect of catalyst preparation concentration on the conversion of propylene to polymer. The same general procedure outlined above in Example VII was followed except that the concentration of the catalyst components in the inert liquid diluent (n-heptane) was varied between 14 and 109 grams per liter. The following results were obtained in this series of experiments:

Table III
EFFECT OF CATALYST PREPARATION CONCENTRATION ON CONVERSION OF PROPYLENE TO POLYMER

[2.8 grams total catalyst; 30 wt. percent propylene (210 g.) in n-heptane; 1 hour; 70° C.; 200–400 p.s.i.g. Al/Ti=6:1]

| Run No. | 10 | 11 | 12 | 13 |
|---|---|---|---|---|
| Composition of catalyst: | | | | |
| Mole percent AlEt$_2$Cl | 33 | 33 | 67 | 67 |
| Mole percent AlEt$_3$ | 67 | 67 | 33 | 33 |
| Concentration during preparation, gm./l | 14 | 109 | 14 | 109 |
| Conversion, percent | 12 | 19 | 9 | 23 |

It will be noted that a high conversion of propylene to polymer is effected by employing relatively high catalyst concentrations during the catalyst preparation.

EXAMPLE X.—PREPARATION OF POLYPROPYLENE CONTAINING A HIGH PROPORTION OF AMORPHOUS POLYMER

In this example, three runs (runs 14 to 16) were carried out to demonstrate the effect of the relative concentrations of the three catalyst components on conversion and polymer distribution. The same general procedure was followed as outlined above in Example VII except that the molar ratio of the three catalyst components was varied. The following results were obtained in this series of experiments:

Table IV
PREPARATION OF POLYPROPYLENE CONTAINING A HIGH PROPORTION OF AMORPHOUS POLYMER

[3-liter stirred autoclave; 1 hour; 70° C.; 300–400 p.s.i.g. 210 g. propylene (30 wt. percent in n-heptane); 2.8 grams total catalyst. Catalyst prepared at room temperature]

| Run No. | 14 | 15 | 16 |
|---|---|---|---|
| Catalyst Composition: | | | |
| Mole percent AlEt$_3$ | 33 | 67 | 33 |
| Mole percent AlEt$_2$Cl | 67 | 33 | 67 |
| Al/Ti mole ratio | 6 | 6 | 3 |
| Conversion, percent | 9 | 12 | 18 |
| Selectivity, percent: | | | |
| Crystalline polymer | 37 | 2 | 8 |
| Amorphous polymer | 63 | 98 | 92 |

It will be noted that the formation of amorphous polypropylene is favored by (1) increasing the molar ratio of aluminum triethyl to aluminum diethyl chloride and (2) decreasing the molar ratio of aluminum to titanium in the catalyst mixture.

Amorphous hydrocarbon soluble polypropylene having a molecular weight in the range of about 10,000 to 30,000 is useful as a viscosity index improver for lubricating oils, particularly mineral lubricating oils. For example, an amorphous polypropylene having a molecular weight of about 12,000 when evaluated in a mineral lubricating oil gave compositions having the following properties:

EFFECT OF AMORPHOUS POLYPROPYLENE ON VISCOSITY AND VISCOSITY INDEX OF MINERAL LUBRICATING OIL

| Concentration of Polypropylene, Wt. Percent | Oil Composition | | |
|---|---|---|---|
| | Viscosity, Saybolt Seconds | | V.I. |
| | 100° F. | 210° F. | |
| 6 | 1,359.8 | 168.6 | 130 |
| 3 | 555.2 | 84.8 | 134 |
| 1.5 | 321.7 | 60.9 | 132 |
| 0 | 174.0 | 45.7 | 113 |

EXAMPLE XI.—PREPARATION OF POLYPROPYLENE CONTAINING A HIGH PROPORTION OF CRYSTALLINE POLYMER

In this example, two runs (runs 17 and 18) were carried out to demonstrate the effect of reaction temperature on conversion and polymer distribution. The same general procedure outlined in Example VII was followed except that the polymerization reaction temperature was varied between 79° and 100° C. The aluminum alkyl compounds consisted of 33 mol percent aluminum triethyl and 67 mol percent aluminum diethyl chloride and the aluminum to titanium ratio was maintained at 6:1 during these experiments. The following results were obtained in these experiments:

Table V
PREPARATION OF POLYPROPYLENE CONTAINING A HIGH PROPORTION OF CRYSTALLINE POLYMER

[2.8 grams total catalyst; 30 wt. percent propylene (210 g.) in n-heptane; 1 hour; 400–460 p.s.i.g.; Al/Ti=6:1; alkyl aluminum=33% AlEt$_3$; 67% AlEt$_2$Cl]

| Run No. | 17 | 18 |
|---|---|---|
| Temperature, ° C. | 79 | 100 |
| Conversion, percent | 30 | 38 |
| Crystalline polymer, wt. percent of total | 69 | 85 |

EXAMPLE XII.—EFFECT OF MATERIALS OF CONSTRUCTION OF REACTOR ON PROPYLENE POLYMERIZATION

In this example, propylene was polymerized in a number of different polymerization reactors constructed of a number of different materials. More specifically reactors constructed of the following materials were employed:

(1) Chrome steel, Type 410, containing 12–14% chromium.

(2) Chrome-vanadium steel, containing 0.8–1.10% chromium and 0.15–0.20% vanadium.

(3) Stainless steel, Type 316, containing 16–18% chromium, 10–14% nickel and 2–3% molybdenum.

The same general procedure was followed in carrying out the polymerization of propylene in this example as described in Example I.

The following results were obtained in this series of experiments:

Table VI
EFFECT OF MATERIALS OF CONSTRUCTION OF REACTOR ON PROPYLENE POLYMERIZATION

[Rocking bomb; 6/1 Al/Ti ratio; (75% AlEt$_2$Cl-25% AlEt$_3$); 70° C.; 300–500 p.s.i.g.; 2 hours]

| Run No. | 19 | 20 | 21 | 22 |
|---|---|---|---|---|
| Reactor Material | Cr-V Steel. | 316 SS | CR-V Steel packed with lead spheres. | 13% Cr Steel. |
| Conversion, percent | 77 | 53 | 9.5 | 77. |

What is claimed is:

1. A method for preparing oil-soluble, amorphous polypropylene which comprises polymerizing propylene at a temperature of about 25° to 79° C. and at a pressure of about 100 to 400 p.s.i.g. in the presence of a catalyst obtained by mixing aluminum triethyl, diethyl aluminum chloride and titanium tetrachloride, the molar ratio of aluminum triethyl to diethyl aluminum chloride being in the range of about 1:1 to 4:1 and the molar ratio of aluminum to titanium being in the range of about 2:1 to 6:1, said polymerization being carried out in the presence of an inert liquid diluent.

2. Method according to claim 1 wherein the polymerization temperature is about 60° to 75° C.

3. A method for preparing oil-insoluble crystalline polypropylene which comprises polymerizing propylene at a temperature of about 80° to 120° C. and at a pressure of about 100 to 400 p.s.i.g. in the presence of a catalyst obtained by mixing aluminum triethyl, diethyl aluminum chloride and titanium tetrachloride, the molar ratio of aluminum triethyl to diethyl aluminum chloride being in the range of about 1:4 to 1:1 and the molar ratio of aluminum to titanium being in the range of about 6:1 to 12:1, said polymerization being carried out in the presence of an inert liquid diluent.

4. Method according to claim 3 wherein the molar ratio of aluminum triethyl to diethyl aluminum chloride is about 1:2 and the molar ratio of aluminum to titanium is about 6:1.

5. Method according to claim 3 wherein the polymerization temperature is about 90° to 105° C.

6. A method for preparing oil-soluble, amorphous polypropylene which comprises polymerizing propylene in the presence of an inert diluent at a temperature of about 25 to 79° C. at a pressure of about 100 to 2000 p.s.i.g. in the presence of a catalyst obtained by mixing aluminum trialkyl, dialkyl aluminum halide and titanium tetrahalide; the molar ratio of aluminum trialkyl to dialkyl aluminum halide being in the range of about 1:1 to 4:1 and the molar ratio of aluminum to titanium being in the range from 2 : 1 to 6 : 1, the alkyl group of said trialkyl aluminum and dialkyl aluminum halide having from 2 to 4 carbon atoms, and the halide being selected from the group consisting of chloride, bromide and iodide.

7. A method for preparing oil-insoluble, crystalline polypropylene which comprises polymerizing propylene in the presence of an inert diluent at a temperature of about 80° C. to 100° C. at a pressure of about 100 to 2000 p.s.i.g. in the presence of a catalyst obtained by mixing aluminum trialkyl, dialkyl aluminum halide, and titanium tetrahalide; the molar ratio of aluminum trialkyl to dialkyl aluminum halide being in the range of about 1:4 to 1:1 and the molar ratio of aluminum to titanium being in the range of 6:1 to 12:1; the alkyl groups of said trialkyl aluminum and dialkyl aluminum halide having from 2 to 4 carbon atoms and the halide being selected from the group consisting of chloride, bromide and iodide.

References Cited in the file of this patent

UNITED STATES PATENTS

| | | |
|---|---|---|
| 2,721,189 | Anderson et al. | Oct. 18, 1955 |
| 2,838,477 | Roelen et al. | June 10, 1958 |

FOREIGN PATENTS

| | | |
|---|---|---|
| 526,101 | Italy | May 14, 1955 |
| 534,792 | Belgium | Jan. 31, 1955 |
| 533,362 | Belgium | May 16, 1955 |

OTHER REFERENCES

Chem. and Eng. News, vol. 33, page 2910, July 11, 1955.

Natta et al.: Journ. Am. Chem. Soc., vol. 77 (1955), pages 1708–10.